United States Patent [19]
Nagoshi et al.

[11] Patent Number: 5,495,334
[45] Date of Patent: Feb. 27, 1996

[54] FOURIER TRANSFORM SPECTROSCOPE WITH QUADRANGULAR COMMON PATH INTERFEROMETER

[75] Inventors: Toshiyuki Nagoshi, 23-21, Kasumi-cho, Yagiyama, Taihaku-ku, Sendai-shi, Miyagi 982; Tsutomu Ichimura, Dai 2 Green Haitsu-Zuiho 301, 1-1-20, Mukaiyama, Taihaku-ku, Sendai-shi, Miyagi 982; Fumio Inaba, Sendai, all of Japan

[73] Assignees: Research Development Corporation of Japan, Tokyo; Toshiyuki Nagoshi; Tsutomu Ichimura, both of Sendai, all of Japan

[21] Appl. No.: 735,740

[22] Filed: Jul. 25, 1991

[30] Foreign Application Priority Data

Jul. 26, 1990 [JP] Japan ........................ 2-198760
May 16, 1991 [JP] Japan ........................ 3-111491

[51] Int. Cl.⁶ ........................................... G01B 9/02
[52] U.S. Cl. ........................................... 356/346; 356/345
[58] Field of Search ........................................ 356/346, 345

[56] References Cited

U.S. PATENT DOCUMENTS

| | | | |
|---|---|---|---|
| 2,151,631 | 5/1937 | Williams | 356/345 |
| 4,183,669 | 1/1980 | Doyle . | |
| 4,976,542 | 12/1990 | Smith | 356/346 |
| 4,983,041 | 1/1991 | Inaba . | |
| 5,028,864 | 7/1991 | Lee et al. | 356/346 |

FOREIGN PATENT DOCUMENTS

WO84/03122 7/1985 WIPO .

*Primary Examiner*—Samuel A. Turner

[57] ABSTRACT

An apparatus for effecting spatial Fourier transform spectroscopic detection of light from a surface luminescent object with high sensitivity by use of a quadrangular common path interferometer. The apparatus includes an improvement which consists of an additional imaging optical system which converges a light beam from the specimen so as to enter the beam splitter. The additional imaging optical system is disposed so that an image position is substantially coincident with the position of the second of three mirrors in the apparatus.

3 Claims, 9 Drawing Sheets

Image signal

Image signal

X-Scanning signal generator

FOURIER TRANSFORM SPECTROSCOPE WITH QUADRANGULAR COMMON PATH INTERFEROMETER

BACKGROUND OF THE INVENTION

The present invention relates to a spectroscope designed to obtain a spectral distribution of the incident light by Fourier-transforming a spatial interferogram that is formed by a quadrangular common path interferometer. More particularly, the present invention relates to a Fourier transform spectroscope with a quadrangular common path interferometer which is capable of highly sensitive spectroscopic detection of light from a luminous source with a finite area and, hence, is suitable for spectroscopic detection of extremely weak luminescence, for example, bioluminescence, chemiluminescence, fluorescence from a biological specimen, etc.

Conventional spectroscopes may be roughly classified into the following three types: a dispersive spectroscope that employs a spectroscopic prism or a diffraction grating; a temporal Fourier transform spectroscope designed to obtain a spectral distribution of the incident light by Fourier-transforming the temporal signal of a temporal interferogram that is formed by moving a moving mirror of a Michelson interferometer; and a spatial Fourier transform spectroscope designed to obtain a spectral distribution of the incident light by Fourier-transforming a spatial interferogram that is formed by a double beam interferometer, for example, a quadrangular common path interferometer.

Referring to FIG. 13, in the conventional spatial Fourier transform spectroscope that employs a quadrangular common path interferometer, light from a light source 1 that is placed at the front focal point of a condenser lens L1 with a focal length f is converted into a parallel light beam through the condenser lens L1 and then divided into two beams, that is, transmitted light and reflected light by a beam splitter BS. The transmitted light returns to the beam splitter BS via mirrors M3, M2 and M1 and passes it and is then focused by an imaging lens L2 with a focal length f to form a light source image once at the back focal point of the lens L2. Thereafter, the light, which is now in the form of a divergent light beam, enters a one-or two-dimensional photodetector D that is disposed at a position conjugate with the mirror M2. Meanwhile, the reflected light from the beam splitter BS returns it via the mirrors M1, M2 and M3 in the opposite direction to the above. The light is reflected therefrom and then focused by the imaging lens L2 to form a light source image once at the back focal point of the lens L2. Thereafter, the light enters the photodetector D where it interferes with the above-described transmitted light, thereby forming a spatial interferogram on a detecting surface of the photodetector D. The distance between the successive interference fringes of the interferogram is determined by the inclination angle θ of the mirror M2 from the 45° plane. The interferogram signal that is obtained by the one- or two-dimensional photodetector D is subjected to spatial Fourier transform to analyze the spatial frequency distribution of the signal, thereby obtaining a spectral distribution of the light source 1.

Incidentally, the spatial Fourier transform spectroscope is superior in comparison with the temporal Fourier transform spectroscope, as described below. Therefore, it may be considered practical to use the conventional Fourier transform spectroscope employing a quadrangular common path interferometer such as that shown in FIG. 13. However, it is not necessarily possible to say that the conventional quadrangular common path interferometer has a satisfactory optical arrangement. In particular, it needs two lenses, that is, the condenser lens L1 and the imaging lens L2, and it is necessary to dispose the two-dimensional photodetector D at a position conjugate with the mirror M2.

FIG. 14 shows an equivalent optical path diagram of the conventional Fourier transform spectroscope with a quadrangular common path interferometer. Assuming that a plane that passes through the center of the mirror M2 and perpendicularly intersects the optical axis is defined as a plane A, the detecting surface of the photodetector D as a plane B, the distance between the plane A and the imaging lens L2 as a', and the distance between the imaging lens L2 and the plane B as b', the planes A and B have a positional relationship to each other in terms of the image formation, which is given by $1/a'+1/b'=1/f$ However, the light source 1 and the plane A are not in imagery positional relation to each other. Noting the fact that light beams which travel counter to each other are inclined at 4θ relative to each other by the mirror M2, the interference occurring on the plane B may be considered equivalent to that divergent light beams which are emitted from the respective light sources 1 disposed on respective axes intersecting each other at the position of the plane A with an inclination 4θ relative to each other are converted into parallel light beams through the respective condenser lenses L1, and these two plane waves enter the common imaging lens L2 with an inclination 4θ relative to each other and are once condensed to the back focal point of the lens L2, and then the light beams diverging therefrom interfere with each other to form Young's interference fringes on the plane B (interference plane) that is conjugate with the plane A.

However, as will be clear from the arrangement shown in FIG. 14, the conventional Fourier transform spectroscope with a quadrangular common path interferometer enables interference fringes of high contrast (contrast ratio of about 1) to be obtained on the plane B (also on another plane) only when the light source 1 can be approximated to a point source. If the light source 1 has a finite area, since the plane A is not a geometrical optics image of the light source 1, light at each point on the plane A is superposition of light rays from various points of the light source 1. Accordingly, since the plane B is conjugated with the plane A, light rays from the entire area of the light source 1 are superimposed at each point on the plane B in the same way as in the case of the plane A. As the light source 1 increases in size, the number of light rays superimposed increases. Therefore, although the plane B is a plane where interference fringes can be formed, the contrast lowers as the light source 1 increases in size.

SUMMARY OF THE INVENTION

In view of these circumstances, it is an object of the present invention to solve the above-described problems of the prior art and provide an apparatus for effecting spatial Fourier transform spectroscopic detection of light from a surface luminescent object with high sensitivity by use of a quadrangular common path interferometer.

To attain the above-described object, the present invention provides a Fourier transform spectroscope with a quadrangular common path interferometer, including a beam splitter, first, second and third reflecting mirrors, an imaging optical system, and a detecting means disposed at a position which is substantially conjugate with the second reflecting mirror with respect to the imaging optical system for detecting a one- or two-dimentional distribution image of interference fringes, the beam splitter and the first to third reflecting mirrors being disposed respectively at the vertices of a quadrangle, the first to third reflecting mirrors being arranged such that a light beam transmitted through the beam splitter is sequentially reflected so as to return to a plane of incidence of the beam splitter, while and a light beam reflected from the beam splitter is sequentially reflected in the opposite direction to the above so as to return to a plane of emergence of the beam splitter, whereby a light beam that is first transmitted through the beam splitter and then passed via the first to third reflecting mirrors and transmitted through the beam splitter again is made incident on the imaging optical system, together with a light beam that is first reflected from the beam splitter and then passed via the third to first reflecting mirrors and reflected from the beam splitter again, thereby causing the two light beams to interfere with each other at a position which is substantially conjugate with the second reflecting mirror with respect to the imaging optical system, and the resulting interference fringes are detected with the detecting means and subjected to spatial Fourier transform to thereby obtain a spectral distribution of light from a specimen, wherein the improvement comprises a second imaging optical system which converges a light beam from the specimen so as to enter the beam splitter, the second imaging optical system being disposed so that an imagery position thereof is substantially coincident with the position of the second reflecting mirror.

Preferably, the specimen is one that extends perpendicularly to the optical axis, for example, a biological specimen that emits extremely weak light.

In the Fourier transform spectroscope with a quadrangular common path interferometer, a light beam from a specimen is converged by the second imaging optical system so as to enter the beam splitter, the second imaging optical system being disposed so that an imagery position thereof is substantially coincident with the position of the second reflecting mirror. Accordingly, the light beam that participates in the interference is not the superposition of light rays from the entire area of the specimen as in the prior art, but it is determined by the aperture angle (i.e. the angle of reception of light) which is, in turn, determined by the angle of inclination of the second reflecting mirror, the aperture of the imaging optical system located in front of the detecting means, and the distance from this optical system to the second reflecting mirror. Thus, the contrast becomes higher than in the prior art. In addition, as the specimen increases in size, the contrast of interference fringes becomes progressively higher than in the prior art. In the conventional Fourier transform spectroscope with a quadrangular common path interferometer, as the specimen increases in size, the contrast becomes lower, whereas, in the present invention, as the inclination angle of the second reflecting mirror increases, the contrast becomes lower. In other words, if the resolving power is lowered, it is possible to measure a relatively large specimen. Further, since the apparatus of the present invention needs no movable part, it is possible to achieve spectroscopic detection of high sensitivity with a simplified arrangement. Accordingly, the Fourier transform spectroscope with a quadrangular common path interferometer according to the present invention is suitable for spectroscopic detection of extremely weak luminescence, for example, bioluminescence, chemiluminescence, fluorescence from a biological specimen, etc.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

One embodiment of the Fourier transform spectroscope with a quadrangular common path interferometer according to the present invention will be described below with reference to the accompanying drawings.

Figure 1:
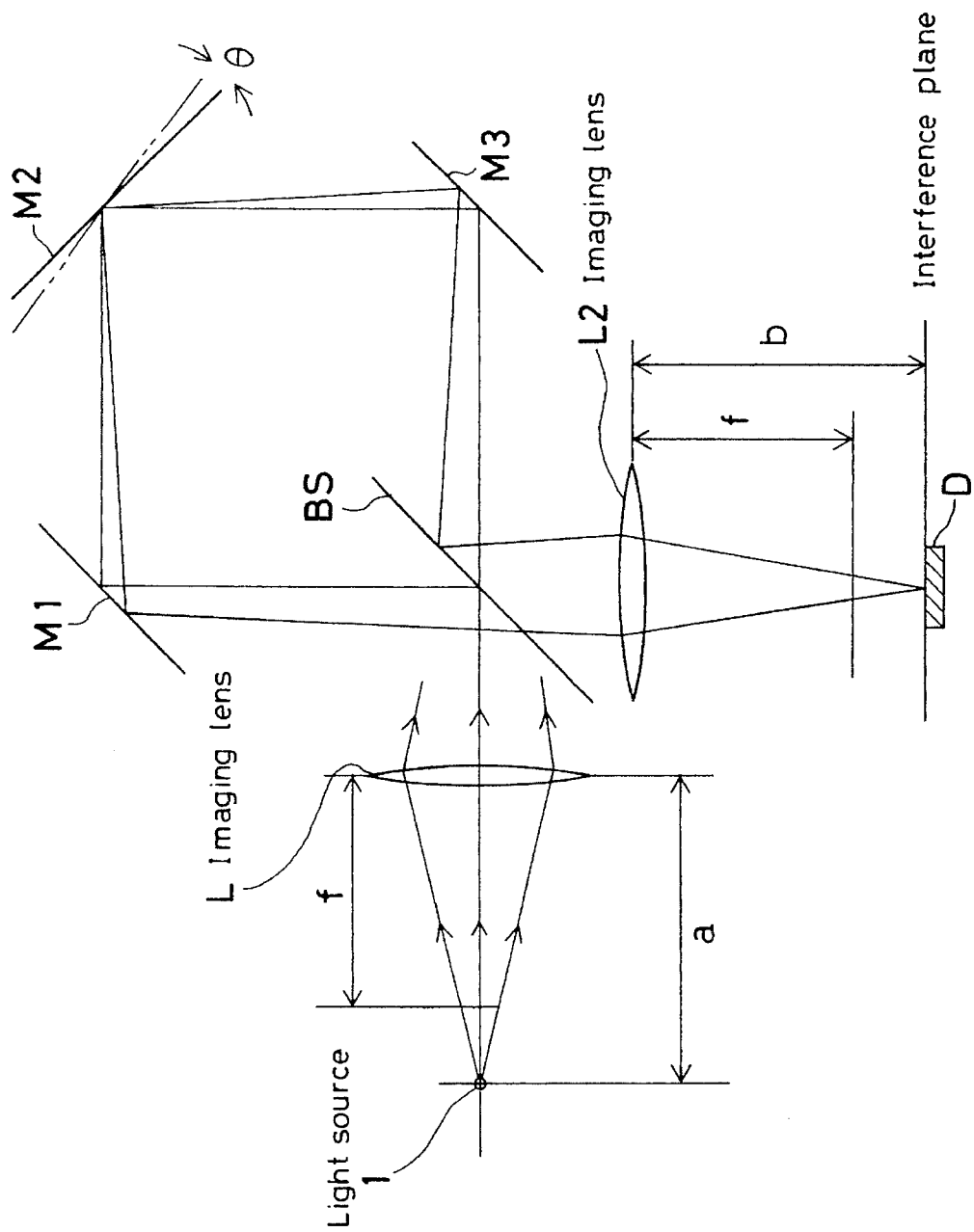
FIG. 1 is an optical path diagram showing one embodiment of the Fourier transform spectroscope with a quadrangular common path interferometer according to the present invention.
Figure 2:
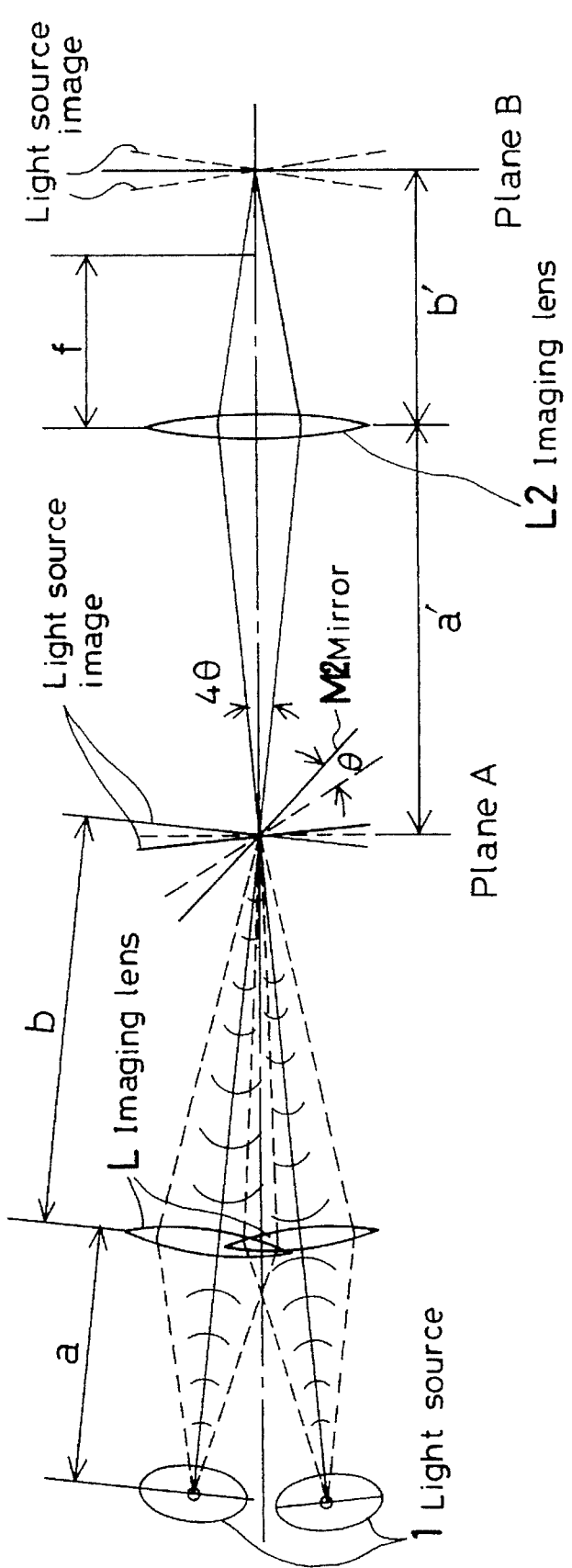
FIG. 2 is an equivalent optical path diagram of the apparatus shown in FIG. 1.
Figure 13:
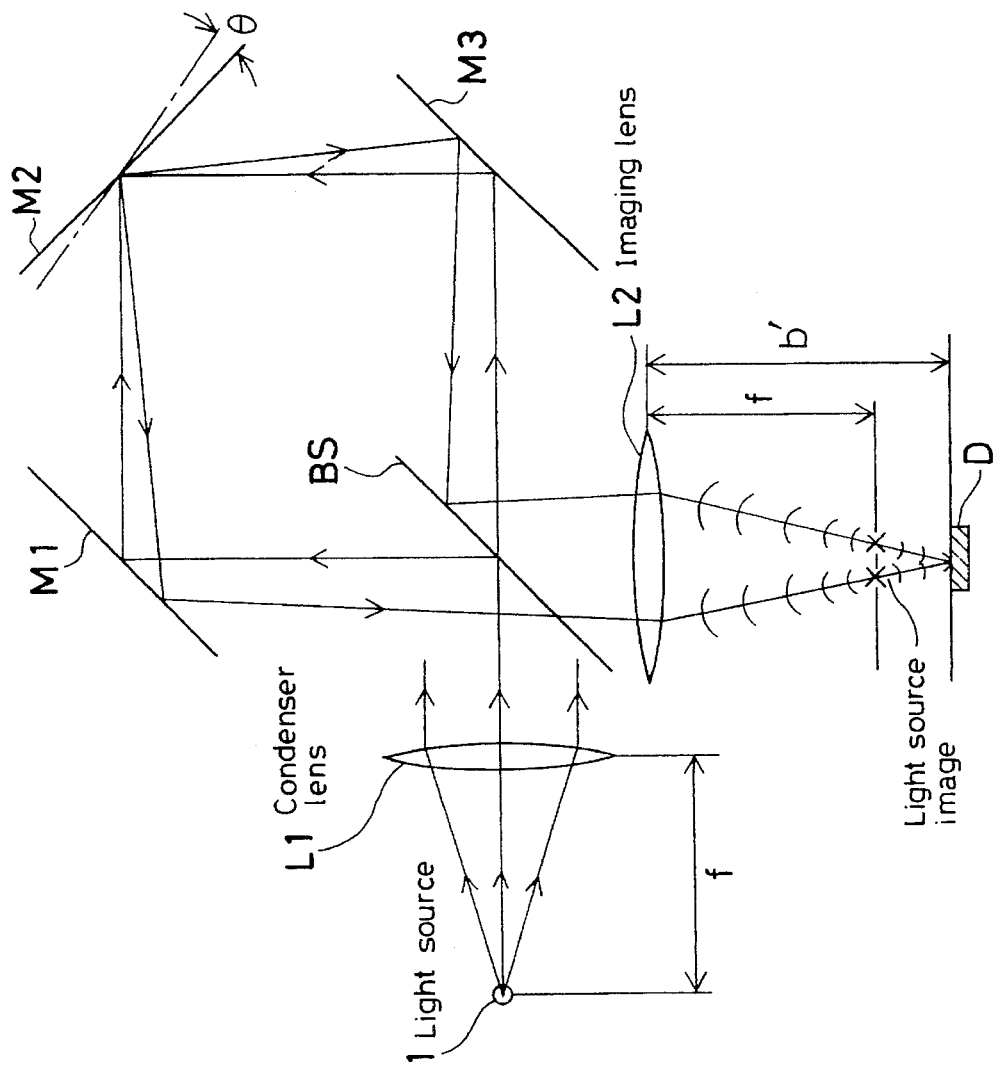
FIG. 13 an optical path diagram showing a conventional spatial Fourier transform spectroscope employing a quadrangular common path interferometer.
Figure 14:
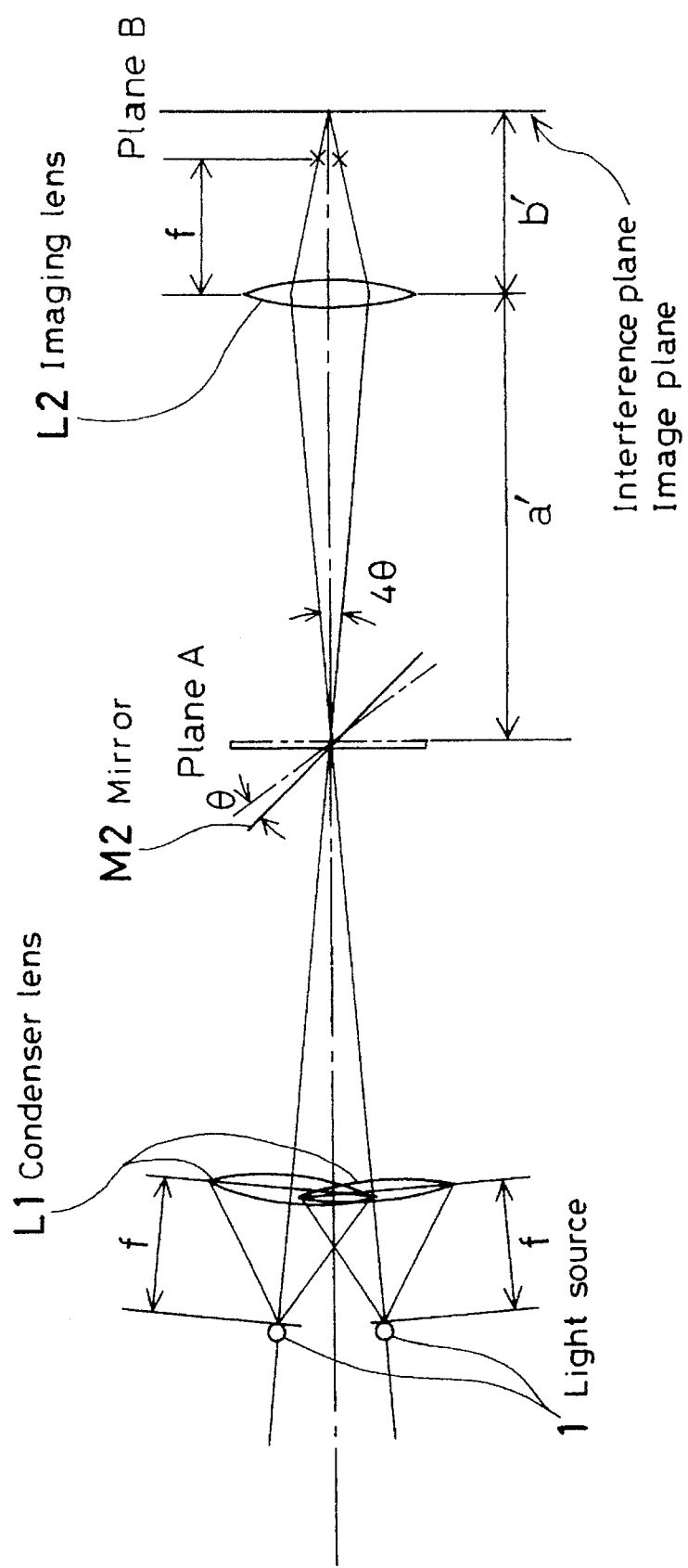
FIG. 14 is an equivalent optical path diagram of the apparatus shown in FIG. 13.

FIG. 1 is an optical path diagram showing one embodiment of the Fourier transform spectroscope with a quadrangular common path interferometer according to the present invention, and FIG. 2 is an equivalent optical path diagram of the apparatus shown in FIG. 1. In these figures, the same constituent elements as those shown in FIGS. 13 and 14 are denoted by the same reference numerals. The arrangement shown in FIGS. 1 and 2 differs from the prior art arrangement shown in FIGS. 13 and 14 in that the spectroscope of the present invention employs an imaging lens L that forms an image of the light source 1 on the mirror M2 in place of the condenser lens L1 that converts the light from the light source 1 into a parallel light beam as in the prior art. For simplification, the focal length of the imaging lens L is assumed to be f.

More specifically, a divergent light beam from a light source 1 which is placed a distance a (a>f) forwardly from a first imaging lens L is converted into a convergent light beam through the imaging lens L and then divided by a beam splitter BS into two beams, that is, transmitted light and reflected light. The transmitted light is condensed (focused) to the position of a mirror M2 via a mirror M3. The optical distance from the imaging lens L to the mirror M2 is assumed to be b. The light beam that is reflected from the mirror M2 returns to the beam splitter BS via the mirror M1 in the form of a divergent light beam again. The light beam is transmitted through the beam splitter BS and condensed through an imaging lens L2 with a focal length f to a position which is conjugate with the mirror M2. At this conjugate position is disposed a one- or two-dimensional photodetector D that detects a spatial interferogram. Meantime, the reflected light from the beam splitter BS is reflected by the mirror M1 in the opposite direction to the above so as to be condensed to the position of the mirror M2 and then returns to the beam splitter BS via the mirror M3. The reflected light is further reflected by the beam splitter BS and focused through the imaging lens L2 to a detecting surface of the photodetector D conjugate with the mirror M2, thus causing interference with the above-described transmitted light to thereby form a spatial interferogram on the detecting surface of the photodetector D. The distance between the successive interference fringes of the interferogram is determined by the inclination angle θ of the mirror M2 from the 45° plane. The interferogram signal that is obtained by the one- or two-dimensional photodetector D is subjected to spatial Fourier transform to analyze the spatial frequency distribution of the signal, thereby obtaining a spectral distribution of the light source 1.

Assuming that a plane that passes through the center of the mirror M2 and perpendicularly intersects the optical axis is defined as a plane A, the detecting surface of the photodetector D as a plane B, the distance between the plane A and the imaging lens L2 as a', and the distance between the imaging lens L2 and the plane B as b', the light source 1 and the plane A are in imagery positional relationship with each other, which is given by $$1/a + 1/b = 1/f$$

and the planes A and B have an imagery positional relationship which is given by $$1/a' + 1/b' = 1/f$$

Thus, the light source 1 and the plane B, which is an interference plate, are in imagery positional relation with each other. Accordingly, the fact that light beams which travel counter to each other are inclined at 4θ relative to each other by the mirror M2 is equivalent to that divergent light beams which are emitted from respective points on different surface light sources 1 disposed on respective axes intersecting each other at the position of the plane A with an inclination 4θ relative to each other are converted into convergent light beams through the respective imaging lenses L and condensed so as to be focused on image planes which are inclined forwardly and backwardly, respectively, relative to each other at an angle of 4θ, including the plane A set at the position of the mirror M2. With each of the inclined light source images defined as a set of point sources, divergent light beams from particular corresponding points on the light source images enter the imaging lens L2 at an aperture angle (i.e., the angle of reception of light) which is determined by the aperture of the imaging lens L2 and the distance a' (and hence the distance b') and are condensed again to the corresponding points on the respective image planes including the plane B. Accordingly, interference fringes based on the distance between the two image planes are produced on the plane B.

Figure 3:
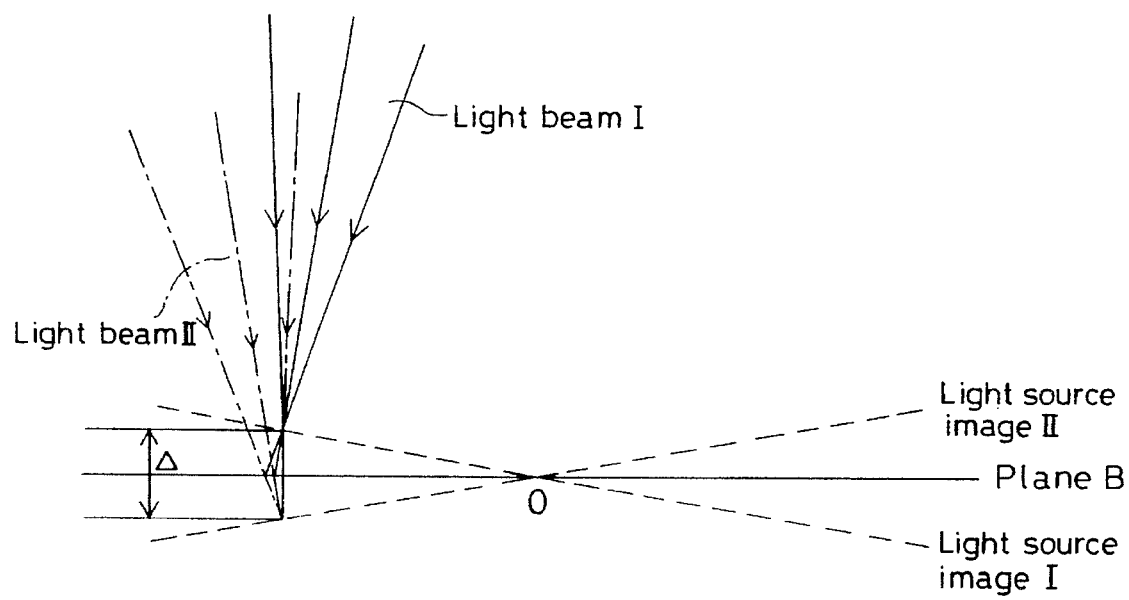
FIG. 3 illustrates the way in which interference occurs.

The interference occurring on the plane B will be explained below in more detail. Referring to FIG. 3, a light source image that is formed in the vicinity of the plane B via the mirrors M1, M2 and M3 is defined as a light source image I, while a light source image formed in the vicinity of the plane B via the mirrors M3, M2 and M1 is defined as a light source image II. Light beams I and II that are emitted from a particular point on the light source 1 and condensed to the respective planes of the light source images I and II are shown by the solid and one-dot chain lines, respectively, as illustrated. Accordingly, the light beam I that is condensed to the plane of the light source iamge I and then diverged again and the light beam II that is to be condensed to the plane of the light source image II are incident on the plane B. Since these light beams I and II are light emitted from the same point on the surface light source 1, the beams I and II interfere with each other on the plane B. Whether or not the interference is the one that enhance the two beams each other is determined according to whether or not the distance Δ between the two image planes is an integer multiple of the wavelength. Therefore, interference fringes which are equally spaced are produced on the plane B, depending upon the wavelength. On the plane B, the spread of the two light beams becomes larger as the distance from the center O increases; therefore, the remoter from the center O, the lower the contrast of the interference fringes. Moreover, the spread of the light beams I and II on the plane B is determined by the aperture angle (i.e., the angle of reception of light) which is, in turn, determined by the inclination angle θ of the mirror M2, the aperture of the imaging lens L2 and the distance a' (and hence the distance b'). In addition, the range within which interference fringes can be produced is determined by the region that is defined by the light source images I and II.

As has been described above, the superposition of light beams on the plane B is not the superposition of light beams from the entire area of the light source 1 as in the prior art, but it is determined by the aperture angle (i.e., the angle of reception of light) which is, in turn, determined by the inclination angle θ of the mirror M2, the aperture of the imaging lens L2 and the distance a' (and hence the distance b'). Accordingly, when the aperture angle (4θ) that is determined by the inclination of the mirror M2 is smaller than the angle that is estimated for a finite light source by the condenser lens in the prior art apparatus, the contrast is higher in the present invention than in the prior art. In other words, the apparatus of the present invention enables the contrast of the interference fringes to become progressively higher than in the prior art as the light source increases in size. In the conventional Fourier transform spectroscope with a quadrangular common path interferometer, the contrast lowers as the specimen increases in size, whereas, in the present invention, the contrast lowers as the inclination angle of the second reflecting mirror increases. In other words, if the resolving power is lowered, it is possible to measure a relatively large specimen. Moreover, a surface light source does not necessitate points thereon to be coherent to each other. Since the apparatus of the present invention needs no movable part, it is possible to achieve spectroscopic detection of high sensitivity with a simplified arrangement. By virtue of the foregoing advantageous features, the Fourier transform spectroscope with a quadrangular common path interferometer according to the present invention is suitable for spectroscopic detection of extremely weak luminescence, for example, bioluminescence, chemiluminescence, fluorescence from a biological specimen, etc.

In the present invention, various known types of photodetector may be employed as the one- or two-dimensional photodetector D. Such known photodetectors may be roughly classified into solid-state image sensors and photoelectric conversion image sensors. Examples of solid-state image sensors include a parallel independent processing photodiode array shown in FIG. 4, a charge-coupled device (CCD) type image sensor shown in FIG. 5, and a field-effect transistor (MOS) type image sensor shown in FIG. 6.

Figure 4:
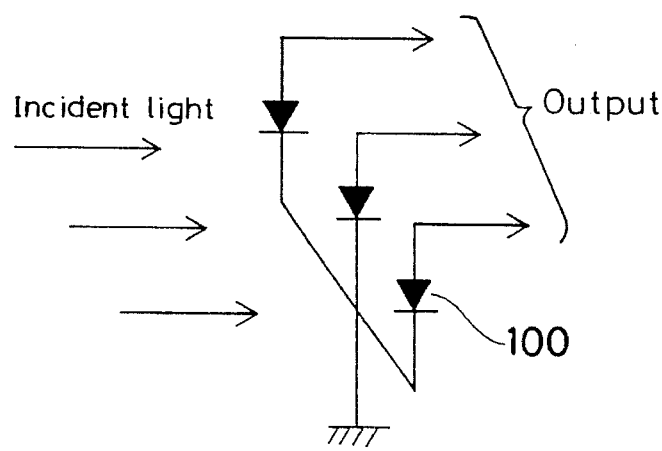
FIGS. 4 to 12 illustrate examples of known one- or two-dimensional photodetectors.

The parallel independent processing photodiode array is arranged such that photodiodes 100 with photovoltaic effect are arranged in the form of an array and wired, as shown in FIG. 4, so that an output of each photodiode can be taken out directly. Since a signal can be independently extracted from each photodiode, it is possible to access a specific photodiode according to need and perform parallel independent processing of signals from the photodiodes, for example, processing of changing over a signal having the background light removed therefrom (i.e., AC component signal) and a signal having the background light left therein (i.e., DC component signal) from one to the other.

Figure 5:
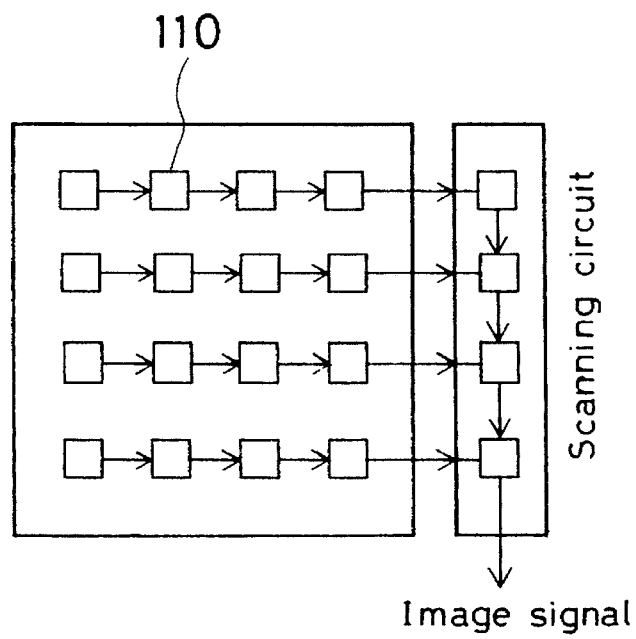

The CCD type image sensor is arranged such that a p-type layer is formed on, for example, an n-type silicon wafer by diffusion or or epitaxial growth and then electrodes are provided thereon in such a manner that picture elements 110 each comprising three electrodes are arranged in a matrix, as shown in FIG. 5. By sequentially and selectively switching the voltage applied to three electrodes constituting each picture element, a signal charge (e.g., holes) induced by the incident light is sequentially transferred in one direction, thereby taking out an image signal. By cooling CCD, it is possible to reduce the dark current and fixed noise, which are generated at ordinary temperatures.

Figure 6:
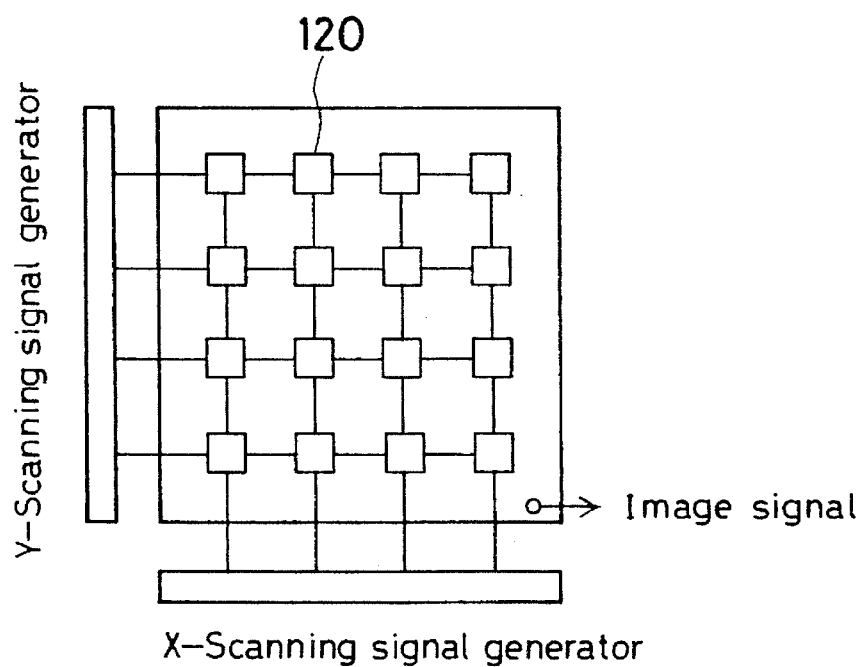

The MOS type image sensor is arranged such that picture elements 120 each comprising two electrodes which correspond respectively to X-and Y-coordinates are arranged in a matrix, as shown in FIG. 6, and each picture element constitutes a switching circuit together with a scanning circuit formed from MOS type field-effect transistor. To take out an image signal from the sensor, scanning pulses are applied to the picture elements from X- and Y-axis scanning signal generators shown in FIG. 6, and signal charges that are induced in the picture elements in response to the incident light are taken out as a signal current from picture elements whose electrodes corresponding to the X- and Y-axes are 0 in voltage.

Figure 7:
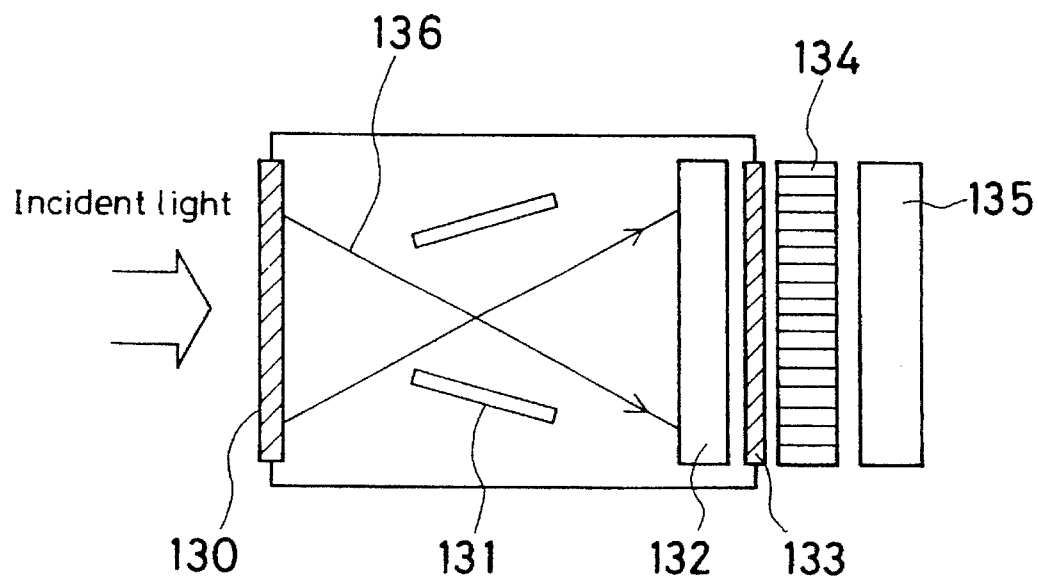
Figure 8:
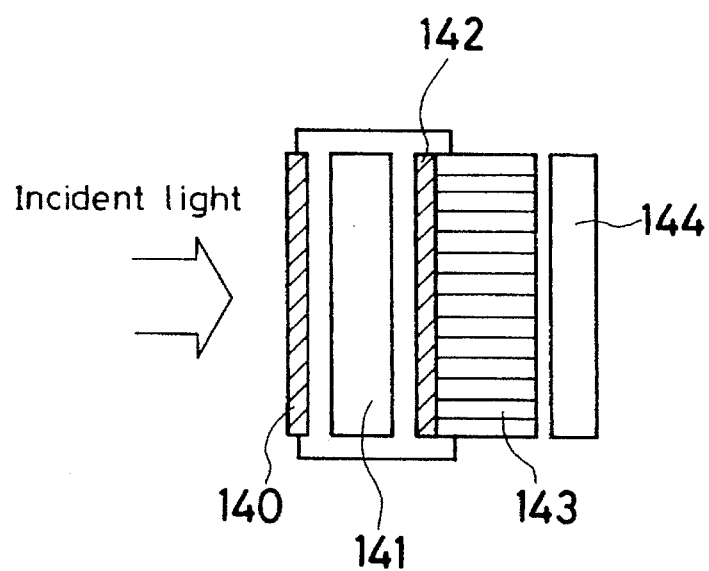
Figure 9:
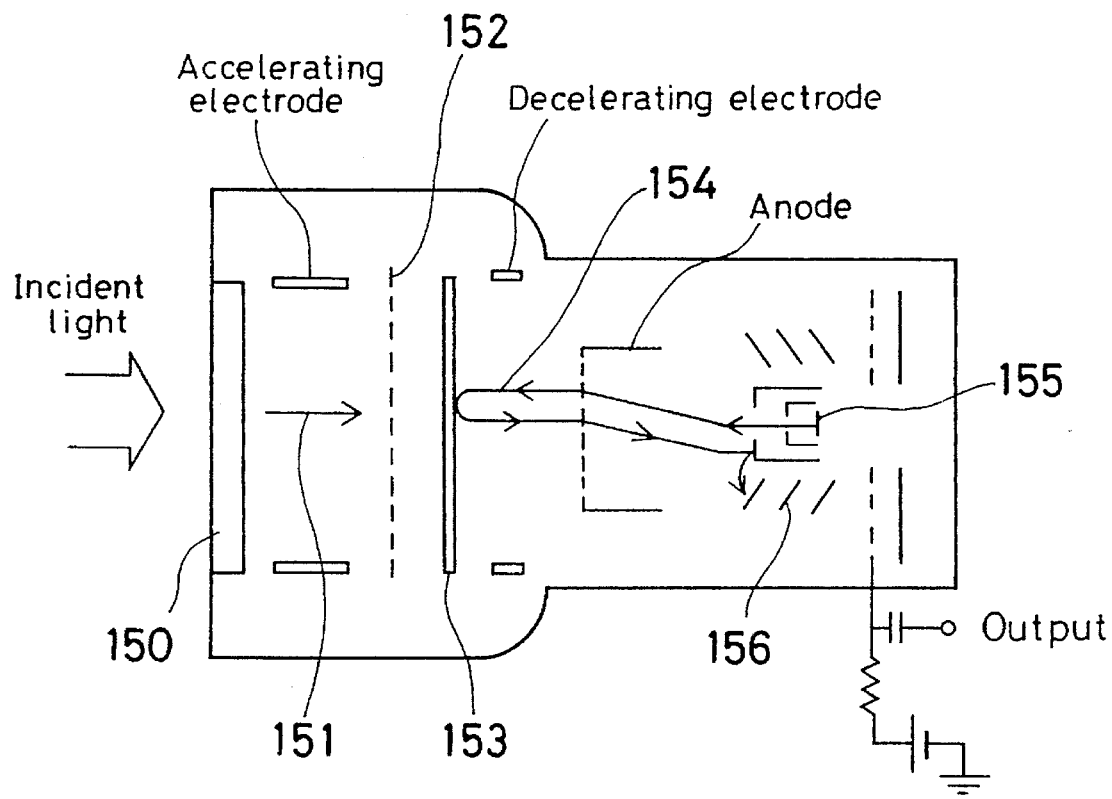
Figure 10:
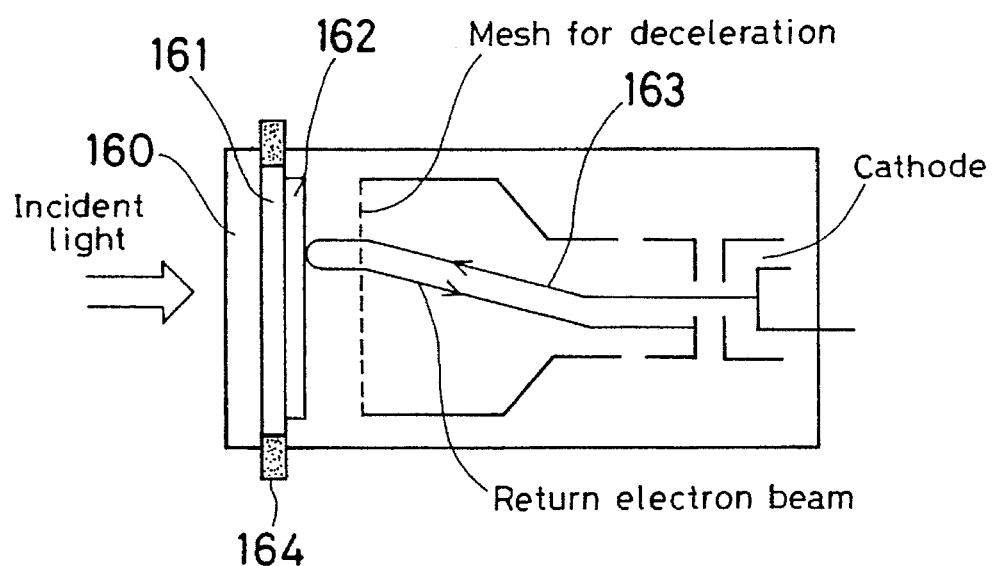
Figure 11:
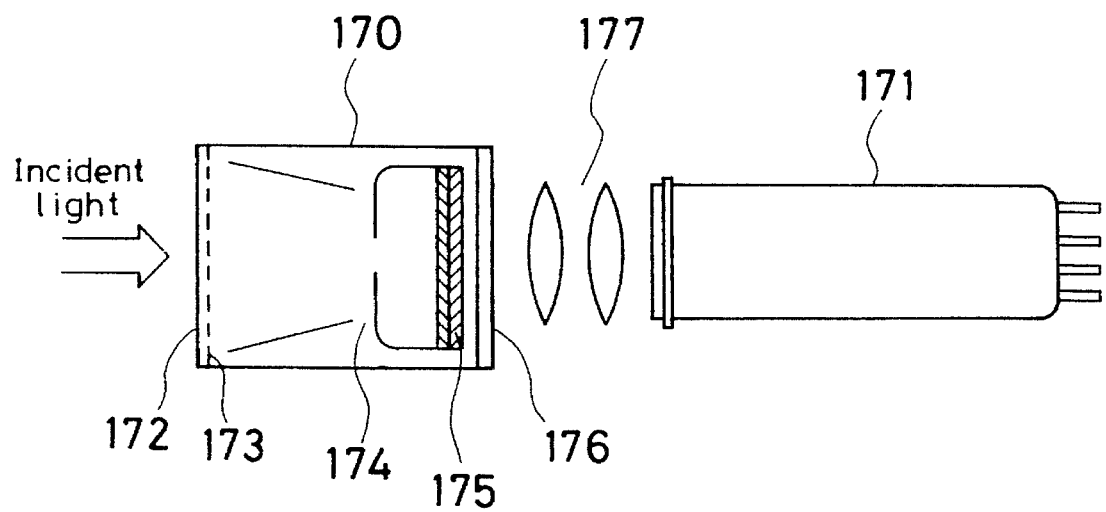
Figure 12:
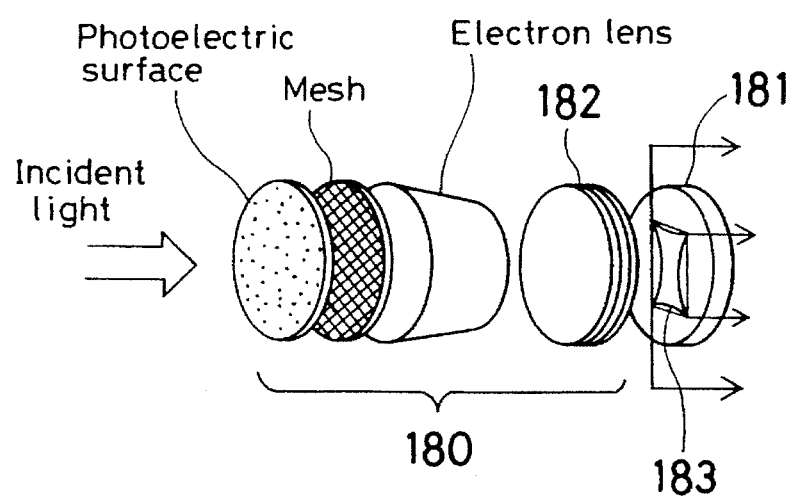

Examples of photoelectric conversion image sensors include a static focus MCP diode array which comprises a combination of a microchannel plate (MCP) and a diode array, as shown in FIG. 7, a proximity MCP diode array such as that shown in FIG. 8, an image orthicon shown in FIG. 9, a vidicon shown in FIG. 10, a photonic microscope system (VIM system) which comprises a combination of a MCP and a vidicon, as shown in FIG. 11, and a photocounting image acquisition system (PIAS) which comprises a combination of a MCP and a semiconductor position detecting element, as shown in FIG. 12.

In the static focus MCP diode array, as shown in FIG. 7, incident light causes emission of photoelectrons 136 on a photoelectric surface 130, and the photoelectrons are accelerated and focused by an electron lens system 131 to enter an MCP 132. The electrons are multiplied in the MCP 132 and made incident on a fluorescent screen 133 to emit light. The light emitted from the fluorescent screen 133 enters a diode array 135 through optical fibers 134 to output an image signal.

In the proximity MCP diode array, as shown in FIG. 8, incident light causes emission of photoelectrons on a photoelectric surface 140, and the photoelectrons enter an MCP 141 directly. The electrons are multiplied in the MCP 141 and made incident on a fluorescent screen 142 to emit light. The light from the fluorescent screen 142 enters a diode array 144 through optical fibers 143 to output an image signal.

In the image orthicon, as shown in FIG. 9, photoelectrons 151 are emitted from a photoelectric cathode 150 in accordance with the incident light, and the photoelectrons 151 are accelerated to pass through a target mesh 152 and collide against a target (low-resistance glass plate with a thickness of several μm) 153. As a result, secondary electrons are emitted from the target 153 and these electrons are collected on a target mesh, so that a positive charge image corresponding to the incident light is formed on the target. When the target surface is scanned with an electron beam 154 in this state, the positive charge on the target surface is neutralized since a retarding field is formed near the target surface. The electrons left after the neutralization have been density-modulated by the positive charge on the target. The electron beam arrives near an electron gun 155 through substantially the same orbit as the previous electron orbit. The return electron beam is amplified by a secondary-electron multiplier 156 that is disposed near the electron gun 155, thereby outputting an image signal.

In the vidicon, a target has a structure in which a transparent conductive film 161 and a photoconductive film 162 with a high resistivity are stacked up on a transparent faceplate 160, as shown in,FIG. 10. If there is incident light after scanning with an electron beam 163, electron-hole pairs are generated. The electrons flow through the transparent conductive film 161 to a signal electrode 164, whereas the holes move to the scanned surface of the photoconductive film 162. When the surface of the photoconductive film 162 is scanned again with the electron beam 163, the electron beam flows into the target in accordance with the size of surface potential built up by the holes and comes out through the signal electrode 164 in the form of an image signal.

The VIM system comprises a combination of a two-dimensional photon counting tube 170 and a low-visual persistence vidicon 171, as shown in FIG. 11. Light that enters the two-dimensional photon counting tube 171 generates photoelectrons on a photoelectric surface 172, and the photoelectrons pass through a mesh 173 and an electron lens 174 to enter an MCP (a two-stage MCP in the example shown in FIG. 11) 175 where the photoelectrons are amplified and then strike on a fluorescent screen 176 as a plane of emergence to form bright dots, which are focused to a photoelectric surface of the low-visual persistance vidicon 171 through a lens system 177, thereby obtaining an image signal corresponding to the incident light from the output of the vidicon 171.

The PIAS system comprises a combination of a two-dimensional photon counting tube 180 similar to that employed in the VIM system (however, the photon counting tube 180 has a three-stage MCP) and a silicon semiconductor detecting element 181, as shown in FIG. 12. Photoelectrons from the MCP 182, which have been multiplied and accelerated, enter the semiconductor position detecting element 181 where they are further multiplied by the electron bombardment effect produced when entering the detector 181, and are then output in the form of current from four electrodes 183 around the detector 181 through a resistance layer of the detecting element 181. By inputting the four outputs to a position computing unit (not shown), a position signal corresponding to the incident light is obtained.

Although some typical one- or two-dimensional photodetectors have been described above, it should be noted that photodetectors which can be used in the Fourier transform spectroscope with a quadrangular common path interferometer according to the present invention are not necessarily limited to those described above and that any type of detector which can detect light in a one- or two-dimensional manner can be employed.

The following is a description of advantages of the spatial Fourier transform spectroscopy, which is utilized in the present invention, over the temporal Fourier transform spectroscopy.

The Fourier transform spectroscopy in which a temporal interferogram is subjected to Fourier transform is superior to the conventional dispersive spectroscopy and therefore it has been developed and put to practical use as an apparatus that provides high brightness and high resolving power. More specifically, the temporal Fourier transform spectroscopy has heretofore been considered superior to the dispersive spectroscopy because of two advantages:

(1) Advantage of simultaneous photometry (multiplex advantage or Fellgett advantage)

(2) Advantage of the utilization of light flux (Jacquinot advantage)

However, the conventional Fourier transform infrared spectroscopy has been mostly applied to the measurement of absorption of light, and it has not been employed for spectroscopic detection of a weak light source or luminescent object. For this reason, researchers in this field have believed the above-described advantages to be true like theorem for a long time without making experimental confirmation.

In the spectroscopic detection of extremely weak light such as biological photons, however, whether a particular spectroscopy is superior or not is readily known from the results of the measurement. We conducted a comparative examination of various kinds of spectroscopy in order to achieve high-brightness spectroscopic detection of biological photons which are so weak as to be invisible to the human eye and, as a result, have revealed that the above-described advantages are not valid.

First, in the examination of the advantage of simultaneous photometry (in general, this advantage is expressed as multiplex advantage in terms of the Fourier transform spectroscopy, while it is expressed as the advantage of simultaneous photometry in terms of the multichannel detection photometry, for distinction; however, the physical contents are common to these two). This advantage has heretofore been believed as follows: Assuming that the overall measuring time is T, the measuring time for one spectral element is T in the temporal Fourier transform spectroscopy, and T/N (N: the number of spectral elements) in the dispersive spectroscopy. However, comparison of three different types of spectroscopy, that is, (1) FT-IR, (2) wavelength scanning dispersive monochromator, and (3) polychromator, reveals that the contents of the above statement are false.

In comparison of the FT-IR and the wavelength scanning dispersive monochromator, the FT-IR is arranged to detect interference fringes in a time-base domain from a detector, with a moving mirror being scanned, and subject the detected fringes to Fourier transform, thereby obtaining spectral information (spectroscopic information). Accordingly, scanning is effected for the interference regions in place of the spectral regions to take in observation wavelengths. The information obtained from the interference regions and the spectral information are in mathematical connection to each other, so that, if the time required to take in all the elements is the same, the same result is obtained with the two methods. In other words, if the wavelength scanning of the wavelength scanning monochromator is performed in the same way as the moving mirror of the FT-IR is driven, the process is equivalent to, that the observation wavelengths are taken in for the spectral regions. Thus, the two methods differ from each other only in the way of taking in observation wavelengths, that is, whether wavelengths are taken in for the interference regions or for the spectral regions; otherwise, the two methods are the same as long as the measuring time is the same. In other words, even if the scanning time of the moving mirror in the FT-IR is lengthened, there is no advantageous effect to reduce variations of the signal light as in the polychromator. If a detector noize, however, is overwhelmingly high, this cannot be applied. Accordingly, the advantage that has heretofore been pointed out is not valid.

In contrast, a simultaneous measurement type polychromator wherein, in a dispersive spectroscope, no exit split is provided and a large number of spectral elements are observed with an array type detector, such as the polychromator (Japanese Patent Application No. 01-208744) developed by the present inventors, has no scanning part and therefore the measuring time for one spectral element is T. Accordingly, unlike the above-described (1) FT-IR and (2) wavelength scanning dispersive monochromator, the polychromator has the advantage that the observation time can be lengthened by an amount corresponding to the number of spectral elements.

That is, the advantage of simultaneous photometry, which has heretofore been pointed out, applies to the simultaneous measurement type polychromator. The Fourier transform spectroscopy that employs a static triangular or quadrangular common path interferometer has this advantage.

Table below shows the natures of various kinds of spectroscope in regard to the advantage of simultaneous photometry.

| Advantage of simultaneous photometry | |
|---|---|
| Available | Unavailable |
| Dispersive multiwavelength simultaneous measurement polychromator | Scanning dispersive monochromator (with scanning part) |
| Spatial Fourier transform spectroscope with triangular or quadrangular common path interferometer | Michelson Fourier transform spectroscope (with scanning part) |

The advantage of the utilization of light flux (the advantage of brightness, Jacquinot advantage) will next be examined. Hitherto, the utilization of light flux has been defined as the product of the effective cross-sectional area of a spectroscopic element and the solid angle that is formed by an exit opening(slit or aperture) for taking out light with respect to the center of the spectroscopic element, and used to make a comparison between various kinds of spectroscopy. However, it is necessary in an actual spectroscope to take into consideration that, when the exit opening defines the imagery plane of the entrance opening, the effects produced by the slit width and height of the exit opening are not the same. When the exit opening defines not an imagery plane but an interference plane, the contrast of the interference fringes lowers as the entrance slit width increases. This means that it is necessary to take into consideration the partial coherence that is determined by the relationship between the entrance lens aperture and the slit width. Thus, it is necessary to take into consideration the effects of the slit width and the slit height and the contrast of the interference fringes.

The above-described advantage of the Michelson Fourier transform spectroscope has heretofore been considered such that the spectroscopy that employs an interferometer needs no slit but can employ an entrance opening (exit opening) with a large area instead and can use an optical system with a large solid angle. Let us consider first the size of the light source. In the Michelson interferometer, the distance of travel of the moving mirror determines the number of moving interference fringes and hence determines the resolving power of the apparatus. The longer the path difference, the higher the resolving power. It is assumed that the moving mirror has moved through the same distance d as the size (width) of the diffraction grating of a dispersive spectroscope. If the object is assumed to be monochromatic light of wavelength λ, 2d/λ interference fringes are obtained. At this time, in order to enable a photodetector to detect, interference fringes in the time domain, it is necessary to detect only the light that is coincident with the size of the central fringe (i.e., the size of the light source) of concentric interference fringes formed by the Michelson interferometer. This condition is equivalent to a circular opening or a lens with an aperture d and the angle of diffraction of a 0-order Fraunhofer diffraction pattern by a diffration grating. In other words, assuming that the size of the converging mirror and the size of the diffraction grating in the dispersive diffration grating spectroscope and the size of the collimating lens and the path difference d in the Michelson interferometer are equal to each other, the incident angle of the light source is equal to the diffraction angle of the 0-order diffraction pattern. Accordingly, the following conclusion is reached:

(1) When interference fringes are detected with a photodetector, a slit is needed at the incident side of the light source or in front of the photodetector in order to detect only the central fringe of the concentric interference fringes formed by the Michelson interferometer (i.e., the statement that no slit is needed is false).

(2) It is possible to use only an entrance opening with an area which is equal to the size of the 0-order Fraunhofer diffraction pattern for an aperture equal to the size of the entrance lens, the converging mirror and the diffraction grating (i.e., the statement that an entrance opening with a large area can be used is false).

Next, let us consider the slit effect. The Michelson interferometer takes out light at and near the central portion of concentric interference fringes with a circular opening. If a longitudinal slit is used as in the dispersive spectroscope, interference fringes of lateral stripes are produced in the central portion of the concentric interference fringes, so that cancellation of intensity occurs when the light is taken out with a photodetector. Therefore, it is possible to take out only the light of the size equal to that of the circular opening. In the dispersive spectroscope, the slit width participates in the resolving power of the spectroscope, and the longitudinal axis thereof has energy addition effect. When the width of the slit is set to the size of the 0-order diffraction pattern and the slit height is set to h, the energy addition effect is given by $h/(\lambda/d)$. This represents the number of 0-order diffration patterns which can be contained within the slit height, and this number is much larger than in the Michelson interferometer. In triangular and quadrangular common path interferometers, an increase in the slit width causes a lowering in the contrast of the interference fringes, so that the region of the interference fringes decreases, resulting in a lowering in the resoling power. However, since the interference fringes are longitudinal lines, an increase in the slit height provides energy addition effect. This is the same as in the case of the dispersive spectroscope.

Thus, the above-stated advantage of the utilization of light flux is false, and the conclusion is contrary to it.

Table below shows the natures of various kinds of spectroscope in regard to the advantage of the utilization of light flux.

| Advantage of utilization of light flux | |
|---|---|
| Available | Unavailable |
| Dispersive spectrosope | Michelson interferometer |
| Spatial Fourier transform spectroscope with triangular or quadrangular common path interferometer | |

Thus, the Fourier transform spectroscope with a quadrangular common path interferometer according to the present invention is excellent in terms of both the advantage of simultaneous photometry and the advantage of the utilization of light flux in comparison to the temporal Fourier transform spectroscope.

To further explain the merits of the present invention, the following three different types of spectroscope will be compared: i) the high-sensitivity multiwavelength simultaneous photometry type spectroscope (i.e., the above-described simultanous measurement polychromator; already filed as Japanese Patent Application No. 01-208744) wherein a one- or two-dimensional photodetector is combined with a dispersive spectroscope that employs a diffration grating to form a novel spectroscopic optical system with a view to achieving high sensitivity; ii) the Fourier transform spectroscope with a Michelson interferometer (i.e., the above-described FT-IR) wherein a temporal interferogram is formed with a moving mirror of the Michelson interferometer, which is widely employed for infrared spectroscopy, being moved, and the temporal signal is subjected to Fourier transform to thereby obtain a spectrum of the incident light; and iii) the Fourier transform spectroscope with a quadrangular common path interferometer according to the present invention wherein a spatial interferogram is subjected to Fourier transform to obtain a spectral distribution of the incident light.

(1) Features of multiwavelength simultaneous photometry type spectroscope (simultanous measurement polychromator)

1. It is possible to select an observation wavelength region by selecting a region where a multichannel detector is installed.

2. High sensitivity is provided by virtue of the advantage of simultaneous photometry and the advantage of the utilization of light flux.

3. If the width of the entrance slit for the specimen light is increased, the detection sensitivity can be improved correspondingly at the sacrifice of the resolving power.

4. Since the factor that determines the maximum resolving power is the width of the diffraction grating and the practicable width thereof is limited, the maximum resolving power of this apparatus is lower than that of the Fourier transform spectroscope with a Michelson interferometer described below. Since the width of the diffraction grating can be made larger than the width of the multichannel detector, the maximum resolving power is higher than that of the quadrangular common path simultaneous photometry spectroscope.

(2) Features of FT-IR

1. An observation wavelength region cannot be selected with the same detector, so that all the sensitivity regions of the detector are measured.

2. Since neither the advantage of simultaneous photometry nor the advantage of the utilization of light flux is available, as described above, the sensitivity is the lowest of the three spectroscopes.

3. If the path difference between two beams in the Michelson interferometer is reduced and the diameter of the entrance pinhole (needed, as stated above) for the specimen light is increased, the quantity of energy entering the detector is increased correspondingly, so that the sensitivity can be improved at the sacrifice of the resolving power. Although it is possible to increase the slit width in an actual multiwavelength simultaneous photometry type spectroscope (1), it has not yet been contrived to enable the scanning distance of the reflecting mirror to be variable in the Michelson interferometer due to technical difficulties.

4. The factor that determines the maximum resolving power is the path difference between two beams, and the path difference can be made larger than the width of the diffraction grating and the width of the multichannel detector, which are the factors that determine the maximum resolving power in the other spectroscopes. Accordingly, this type of spectroscope can provide the highest resolving power of the three.

(3) Features of the quadrangular common path simultaneous photometry spectroscope according to the present invention 1. An observation wavelength region cannot be selected, so that all the sensitivity regions of the detector are measured.

2. The spatial interferogram Fourier transform spectroscope has both the advantage of simultaneous photometry and the advantage of the utilization of light flux (pointed out in the foregoing description).

3. Since the width of the multichannel detector and the number of channels, which are factors that determine the maximum resolving power, are smaller than the width of the diffraction grating and the number of grooves, this type of spectroscope provides the lowest resolving power of the three at the present time.

4. In comparison to the conventional triangular and quadrangular common path interferometers, which are spatial interferogram Fourier transform spectroscopes, this type of spectroscope enables interference of excellent contrast to be obtained even if the specimen light is large in size, and hence provides high sensitivity. However, since the contrast around the interference fringes lowers as the inclination angle of the second reflecting mirror increases, the effective specimen light area decreases as the resolving power is raised. Accordingly, the detection sensitivity can be improved by increasing the size of specimen light at the sacrifice of the resolving power.

Thus, the spectroscope of the present invention is suitably used when it iS-desired to effect spectroscopic detection of an emission spectrum from a surface luminescent specimen with high sensitivity over the whole sensitivity region of the detector by making use of the advantage of simultaneous photometry, regardless of the resolving power.

As has been described above, in the Fourier transform spectroscope with a quadrangular common path interferometer according to the present invention, a light beam from a specimen is converged by the second imaging optical system so as to enter the beam splitter, the second imaging optical system being disposed so that an imagery position thereof is substantially coincident with the position of the second reflecting mirror of the quadrangular common path interferometer. Accordingly, the light beam that participates in the interference is not the superposition of light rays from the entire area of the specimen as in the prior art, but it is determined by the aperture angle (i.e. the angle of reception of light) which is, in turn, determined by the angle of inclination of the second reflecting mirror, the aperture of the imaging optical system located in front of the detecting means, and the distance from this optical system to the second reflecting mirror. Thus, the contrast becomes higher than in the prior art. In addition, as the specimen increases in size, the contrast of interference fringes becomes progressively higher than in the prior art. Further, since the apparatus of the present invention needs no movable part, it is possible to achieve spectroscopic detection of high sensitivity with a simplified arrangement. Accordingly, the Fourier transform spectroscope with a quadrangular common path interferometer according to the present invention is suitable for spectroscopic detection of extremely weak luminescence, for example, bioluminescence, chemiluminescence, fluorescence from a biological specimen, etc.

What we claim is:

1. A Fourier transform spectroscope with a quadrangular common path interferometer, including a beam splitter, first, second and third reflecting mirrors, an imaging optical system, and a detecting means disposed at a position which is substantially conjugate with said second reflecting mirror with respect to said imaging optical system for detecting a one- or two-dimensional distribution image of interference fringes, said beam splitter and said first to third reflecting mirrors being disposed respectively at the vertices of a quadrangle, said first to third reflecting mirrors being arranged such that a light beam transmitted through said beam splitter is sequentially reflected so as to return to a plane of incidence of said beam splitter, while a light beam reflected from said beam splitter is sequentially reflected in the opposite direction to the above so as to return to a plane of emergence of said beam splitter, whereby a light beam that is first transmitted through said beam splitter and then passed via said first to third reflecting mirrors and transmitted through said beam splitter again is made incident on said imaging optical system, together with a light beam that is first reflected from said beam splitter and then passed via said third to first reflecting mirrors and reflected from said beam splitter again, thereby causing said two light beams to interfere with each other at a position which is substantially conjugate with said second reflecting mirror with respect to said imaging optical system, and the resulting interference fringes are detected with said detecting means and subjected to spatial Fourier transform to thereby obtain a spectral distribution of light from a specimen, wherein the improvement comprises a second imaging optical system which converges a light beam from said specimen so as to enter said beam splitter, said second imaging optical system being disposed so that an imagery position thereof is substantially coincident with the position of said second reflecting mirror.

2. A Fourier transform spectroscope with a quadrangular common path interferometer according to claim 1, wherein said specimen is one that extends perpendicularly to an optical axis of said second imaging optical system.

3. A Fourier transform spectroscope with a quadrangular common path interferometer according to claim 1 or 2, wherein said specimen is a biological specimen.

* * * * *